(12) United States Patent
Zhang et al.

(10) Patent No.: US 12,155,031 B2
(45) Date of Patent: Nov. 26, 2024

(54) COMPOSITE THERMAL BARRIER MATERIALS

(71) Applicant: Hefei Gotion High-Tech Power Energy Co., Ltd., Hefei (CN)

(72) Inventors: Ya Zhang, Hefei (CN); Qian Cheng, Hefei (CN); Steven Cai, Hefei (CN)

(73) Assignee: HEFEI GOTION HIGH-TECH POWER ENERGY CO., LTD., Hefei (CN)

( * ) Notice: Subject to any disclaimer, the term of this patent is extended or adjusted under 35 U.S.C. 154(b) by 571 days.

(21) Appl. No.: 17/441,632

(22) PCT Filed: Mar. 21, 2019

(86) PCT No.: PCT/CN2019/078965
§ 371 (c)(1),
(2) Date: Sep. 21, 2021

(87) PCT Pub. No.: WO2020/186494
PCT Pub. Date: Sep. 24, 2020

(65) Prior Publication Data
US 2022/0166106 A1    May 26, 2022

(51) Int. Cl.
*H01M 10/0525* (2010.01)
*H01M 10/658* (2014.01)
*H01M 50/293* (2021.01)

(52) U.S. Cl.
CPC ..... *H01M 10/0525* (2013.01); *H01M 10/658* (2015.04); *H01M 50/293* (2021.01)

(58) Field of Classification Search
None
See application file for complete search history.

(56) References Cited

U.S. PATENT DOCUMENTS

| 8,765,230 B1 | 7/2014 | Waldrop, III et al. |
| 9,099,762 B2 | 8/2015 | Yang et al. |

(Continued)

FOREIGN PATENT DOCUMENTS

| CN | 103047013 | 4/2013 |
| CN | 103933900 | 7/2014 |

(Continued)

OTHER PUBLICATIONS

Machine Translation of WO 2019088195-A1 (Year: 2019).*

(Continued)

*Primary Examiner* — Gregg Cantelmo
(74) *Attorney, Agent, or Firm* — LOZA & LOZA LLP; Michael Fedrick (57) ABSTRACT

A composite thermal barrier material (100) has a sandwich structure, and comprises an inner layer (110) consisting of an aerogel material which has ultra-low thermal conductivity; and two flame retardant layers (120) which comprising a flame retardant resin matrix (130), wherein the inner layer (110) is sandwiched by the two flame retardant layers (120), and the flame retardant layer (120) also contains an expandable graphite (140), a high temperature decomposable material (150) and a phase change material (160) as functional fillers dispersed in the flame retardant resin matrix (130). The composite thermal barrier material (100) has excellent thermal insulation property, and may stop the thermal propagation when one cell has thermal runaway.

19 Claims, 2 Drawing Sheets

(56) References Cited

U.S. PATENT DOCUMENTS

2005/0100728 A1* 5/2005 Ristic-Lehmann ... F16L 59/028
　　　　　　　　　　　　　　　　　　　　524/544
2016/0380244 A1　12/2016 Evans et al.
2019/0020079 A1* 1/2019 Lee .................... H01M 50/209

FOREIGN PATENT DOCUMENTS

| CN | 105906977 | 8/2016 | | |
|---|---|---|---|---|
| CN | 106931278 | 7/2017 | | |
| WO | 2017106524 | 6/2017 | | |
| WO | WO-2019088195 A1 * | 5/2019 | .......... | H01M 10/625 |

OTHER PUBLICATIONS

International Search Report dated Nov. 15, 2019 for corresponding International Patent Application No. PCT/CN2019/078965.
1 First Office Action issued for corresponding Japanese Patent Application 2021-559476 mailed on May 10, 2022.
Extended European Search Report issued on Oct. 17, 2022 for counterpart European patent application No. 19920506.3.

* cited by examiner

COMPOSITE THERMAL BARRIER MATERIALS

CROSS-REFERENCE TO RELATED APPLICATIONS

This application is the U.S. national stage of International Patent Application No. PCT/CN2019/078965, filed on Mar. 21, 2019 and entitled COMPOSITE THERMAL BARRIER MATERIALS. The disclosure of the foregoing application is incorporated herein by reference in its entirety.

TECHNICAL FIELD

The present invention relates to thermal barrier materials that used in battery module or pack to stop the thermal propagation.

BACKGROUND ART

Over the last two decades, lithium ion batteries have become highly desired power source for new energy vehicle. The current commercially available lithium ion batteries with a graphite anode and layer-structure LIMO (M=Ni, Co, Mn binary or ternary system) cathode have a gravimetric energy more than 250 Wh/kg at the cell level. The industry is continuously pursing for even higher energy density (>300 Wh/kg).

Comparing with lithium ion phosphate batteries with relative lower energy density (160-180 Wh/kg), NCM or NCA based batteries have great advantages in terms of high energy density. However, the safety is a problem due to the high composition of chemical active substance. When a cell suffers from high temperature or overcharging or internal short, it may get into thermal runaway situation, as the result, the battery pack may be exposed to fire or explosion because of thermal propagation, thereby seriously endangering personal safety.

Thus, it is important to stop the thermal propagation in single or number of cells which have thermal runaway in the battery module or pack.

A thermal barrier film, which is made of a thermal insulation material such as glass fibers, asbestos fibers or silicates, is commonly used in the battery module or pack to function as a thermal barrier and a flame retardant. However, it is commonly recognized in the art that such a thermal barrier film is thicker and has a relatively poor effect.

In the other aspect, an aerogel material is known to have ultra-low thermal conductivity, and has been used as a thermal insulation material. For example, CN 103933900A discloses a method for preparing a resorcinol-formaldehyde (RF) aerogel which can be used as a thermal insulation material. However, the aerogel, per se, has a low structural strength and high fragility, thus has poor effect when individually used as a thermal barrier sheet in an electronic device. Moreover, the thermal conductivity of an aerogel can be largely increased when it is used at high temperature.

CN 103047013A discloses a composite material for thermal insulation comprising an aerogel material interposed between two outer layers containing a resin material as matrix. The aerogel material can be protected by the two outer layers so that the mechanical strength can be enhanced. However, the composite material is used for thermal insulation in a gas engine and is mainly used for fire barrier.

CN 106931278A discloses a composite material as a sheathing for heat preservation and thermal insulation, comprising an aerogel material interposed between two flame-retardant layers, and a thermal conduction layer disposed on the outer surface of one flame-retardant layer. The two flame-retardant layers are aluminum-foil or glass-fiber flameproof textile, thus may have poor adhesion to the aerogel material.

Therefore, there is a need to develop a composite thermal barrier material with unique structure to effectively act as a thermal barrier to protect the battery pack.

Summary of this Invention

The present invention is made in view of the above technical problems. In particular, in one aspect, an object of the present invention is to provide a composite thermal barrier material to solve the problem of thermal propagation in a battery pack, and help to stop the thermal propagation when one cell has thermal runaway.

Another object of the present invention is to provide a battery pack comprising the composite thermal barrier material according to the present invention, which can protect the battery pack from thermal damage due to thermal runaway of one cell and ensure a safe design of the battery pack.

In the other aspect, an object of the present invention is to provide a method to prepare the composite thermal barrier material according to the present invention.

To achieve the above purpose, in one aspect, there is provided a composite thermal barrier material which has a sandwich structure, comprising an inner layer consisting of an aerogel material which has ultra-low thermal conductivity of 25 mW/m-K or less; and two flame retardant layers which comprising a flame retardant resin matrix, wherein the inner layer is sandwiched by the two flame retardant layers, and the flame retardant layer still contains an expandable graphite, a high temperature decomposable material and a phase change material as functional fillers dispersed in the flame retardant resin matrix.

There is also provided a battery pack comprising a plurality of cells and spacers disposed between the two neighbor cells, wherein the spacer contains the composite thermal barrier material according to the present invention.

There is also provided a device comprising the battery pack according to the present invention.

In the other aspect, there is provided a method for preparing the composite thermal barrier material according to the present invention, comprising a process of forming the inner layer of an aerogel material; and a process of applying the flame retardant layers on both sides of the inner layer.

In some preferred embodiments, the process of forming the inner layer comprises the following steps:

(1) forming a stable solution of a precursor for forming the aerosol;

(2) gelating the solution by a polycondensation reaction;

(3) aging the sol as obtained in step (2); and (4) subjecting the aged gel to a supercritical drying and shaping it into the desired form or shape.

According to the present invention, the composite thermal barrier material includes a thermal insulating aerogel material as the inner layer and a robust resin layer containing three functional fillers as the outer layer, thus a sufficient mechanical support can be achieved while having an excellent thermal insulation property. Thus, the composite thermal barrier material according to the present invention can solve the above technical problems in the prior art and help to stop the thermal propagation when one cell has thermal runaway. In addition, the battery pack comprising the composite thermal barrier material can protect the battery pack from thermal damage due to thermal runaway of one cell and ensure a safe design of the battery pack.

BRIEF DESCRIPTION FOR THE DRAWINGS

The accompanying drawings, which are included to provide a further understanding of the invention and are incorporated as a part of this specification, illustrate embodiments of the invention and together with the description serve to explain the principles of the invention. In the drawings.

MODES FOR CARRYING OUT THE INVENTION

Hereinafter, embodiments of the present invention will be described in detail with reference to the accompanying drawings such that the technical idea of the present invention can be easily realized by those skilled in the art. It should be understood that the present invention is not limited to the following embodiments and may be embodied in different ways.

The present invention provides a composite thermal barrier material which has a sandwich structure, comprising an inner layer consisting of an aerogel material which has ultra-low thermal conductivity of 25 mW/m-K or less; and two flame retardant layers which comprising a flame retardant resin matrix, wherein the inner layer is sandwiched by the two flame retardant layers, and the flame retardant layer still contains an expandable graphite, a high temperature decomposable material and a phase change material as functional fillers dispersed in the flame retardant resin matrix.

Figure 1:
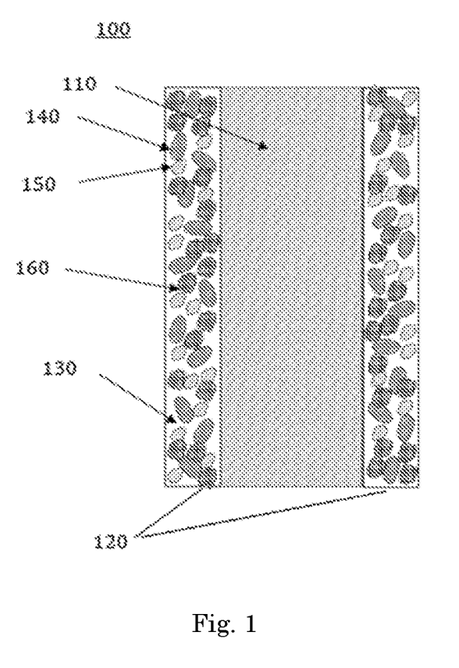
FIG. 1 is a schematic cross-section of the composite thermal barrier material with a sandwich structure according to the present invention.

FIG. 1 is a schematic cross-section of the composite thermal barrier material with a sandwich structure according to the present invention.

The composite thermal barrier material is now specifically described with reference to FIG. 1.

As shown in FIG. 1, the composite thermal barrier material 100 includes an inner layer 110 of an aerogel material, which is sandwiched by two flame retardant layers 120. That is to say, the inner layer 110 is applied with two flame retardant layers 120 on its opposite sides. The single flame retardant layer 120 contains a flame retardant resin 130 as matrix, and three functional fillers of an expandable graphite 140, a high temperature decomposable material 150 and a phase change material 160 which are dispersed in the flame retardant resin matrix.

The inner layer 110 is made of an aerogel material having a proper porosity and thickness so that the inner layer 110 may have a thermal conductivity as low as 25 mW/m-K or less.

An aerogel material has an ultra-low thermal conductivity because it has a high porosity and a torturous cell connection insider the material. It is known that the thermal conduction is operated mainly by three ways of gas conduction, solid conduction and radiative conduction. Among these, gas conduction has the least amount of heat that can be transferred since most of gases have a very low thermal conductivity. Thus, it is common that most thermal insulation materials have a porous structure in which air occupies partial volume of a solid material so that the whole thermal conductivity of the material can be lowered down.

The aerogel material according to the present invention has a porosity much higher than those of most common thermal insulation materials. The porosity of the aerogel material can be expressed in terms of air volumetric percentage (%). In some embodiments, the aerogel material can have an air volumetric percentage of larger than 95%, preferably larger than 97% and more preferably than 99%. In some embodiments, the aerogel material may have a pore size of 100 nm or less, more preferably 50 nm or less, most preferably 10 nm or less.

The aerogel material according to the present invention may has a thickness of about 300 μm or more, preferably about 500 μm or more, and more preferably about 1000 μm or more. If the thickness is less than 300 μm, a desired thermal barrier effect may be not obtained. The upper limit for the thickness is not specifically limited, but preferably 2000 μm or less, more preferably 1200 μm or less, in view of the ease of its manufacture and matching to the battery pack.

As above described, the aerogel material according to the present invention has a thermal conductivity of 25 mW/m-K or less, more preferably 5 mW/m-K or less. If the thermal conductivity is larger than 25 mW/m-K, a desired thermal barrier effect may be not obtained.

According to the present invention, the aerogel material may be made from a nano-size material selected from silica, titanium oxide, chrome oxide, iron oxide, vandia, neodymium oxide, samaria, holmia, carbon (including carbon nanotubes), or any other metal oxide, or any combination thereof. More preferably, the aerogel material is made from silica, titanium oxide, carbon or any combination thereof. Most preferably, the aerogel material is made from silica. Here, the term "nano size" means that the material has a particle size in a nano scale, such as a particle size of 500 nm or less, preferably 100 nm or less, more preferably 50 nm or less.

Alternatively, the aerogel material may contain the above-listed aerogel-forming materials as the main components and additives. In the case that an additive is included, the aerogel material may contain about 60% to 90% by weight of the aerogel-forming material, based on the total weight of the aerogel material. The additives may function to enhance the structure stability or cohesion of the aerogel material, or provide other physical benefits. For example, the aerogel material may include glass fibers as a binder to enforce the composite material with proper mechanical strength, such as glass fibers with the length of 10 μm to 2 mm. In addition, radiative thermal conduction may occur, especially at high temperature. Thus, usually the aerogel material may include opacifiers such as SiC, $TiO_2$ or carbon black to stop the heat radiation, especially in high temperature. The opacifier may be in a form of single crystal or multi-crystal. The opacifier may be in a form of particle and may have a particle size of 1 μm to 50 μm. The particle size can be measure by a laser particle size analyzer such as HORIBA LA-960. Here, the particle size may refer to a secondary particle size of multi-crystal p articles.

In some embodiments, the aerogel material according to the present invention may contain about 60% to 90% by weight of the aerogel-forming material (such as $SiO_2$ having a particle size of 10 nm or a combination of nano-size $SiO_2$ and nano-size $TiO_2$), 5% to 30% by weight of SiC having a particle size of such as 20 μm and 2% to 10% by weight of glass fiber with a length of 100 μm, based on the total weight of the aerogel material.

The aerogel material according to the present invention may not only provide an ultra-low thermal conductivity, but also have advantages such as low light weight and high thermal stability, thus can be useful in the present invention.

The aerogel is usually made of sol-gel polymerization, in which monomers for forming the frame of the aerogel react with each other to form a sol that consists of bonded, cross linked macromolecules, with deposits of liquid solution filling the cells within the macromolecules.

Then, the resultant is subjected to supercritical drying under a supercritical condition. The supercritical condition is not particularly limited and the supercritical drying may be conducted at a condition commonly used in the art. For example, the aged gel may be incubated at supercritical temperature above the critical temperature of a supercritical drying medium to obtain an aerogel. The supercritical drying medium may be selected from carbon dioxide, methanol or ethanol, and may be preferably carbon dioxide. The supercritical drying may be conducted at a supercritical temperature of 30 to 60° C., preferably of 40 to 45° C., under a pressure of 1.01 MPa or more (preferably 5.06 MPa or more, more preferably 7.38 MPa or more), over a holding time of 2 to 5 h, preferably 2 to 3 h.

During the supercritical drying, the liquid solution is evaporated out and a bonded, cross linked macromolecule frame is left behind. In order to have low solid conduction, the resultant should have a small particle size (5 to 20 nm) which enable high contact resistance and tortuous heat path through the sold matrix. This decreases the rate at which heat can flow by solid conduction. Regarding to the gas conduction, since the nanomaterials (such as fumed $SiO_2$) has a pore size less than the average free transportation path of air molecular (74 nm), it may have low convective heat transfer.

In addition, the aerogel material according to the present invention has an extremely low shrinkage at a high temperature. For example, the aerogel material may have a shrinkage of less than 0.5%, preferably less than 0.1% and more preferably about 0%, after it is heated at 600° C. for 24 hours. Furthermore, the aerogel material may have a shrinkage of less than 2%, preferably less than 1.5% and more preferably less than 1%, after it is heated at 900° C. for 24 hours.

According to the present invention, the aerogel material may be deformed when it is subjected to a compression force applied by the neighbor cells due to thermal expansion during operation of a battery. Specifically, the aerogel material according to the present invention has a compression set of 10% or more, preferably 10% to 15%, in a compression experiment in which a load of 10 kg (5×5 $mm^2$) is applied to a test piece having a size of 3×3 $mm^2$ and a thickness of 1 mm for 1 h.

The formation of the aerogel material involves a solution for forming the aerogel material, which contains monomers for forming the frame of the aerogel, a solvent and optionally additives as above described.

The solvent for forming the aerogel material is not particularly limited, and any solvent for forming an aerogel as commonly used in the art can be used. For example, the solvent may be an aqueous liquid such as water or water/ethanol mixture, or an organic solvent such as propylene carbonate, ethylene carbonate, diethylene carbonate, dimethyl carbonate, or an ionic liquid such as 1-ethyl-3-methylimidazolium bis[(trifluoromethyl)sulfonyl] amide.

A specific process for preparing the aerogel material according to the present invention will be described in the following paragraphs.

As above described, the inner layer 110 of an aerogel material is sandwiched by two flame retardant layers 120. As shown in FIG. 1, the inner layer 110 is applied with two flame retardant layers 120 on its opposite sides. The two flame retardant layers 120 may have the same or different composition, depending on the practical need.

A single flame retardant layer 120 contains a flame retardant resin 130 as its matrix, and three functional fillers 140, 150, 160 dispersed in the matrix. The flame retardant resin can provide mechanical support and act as a host for the three functional fillers.

The flame retardant resin is a heat resistant polymer to host functional materials and provide mechanical strength. The specific types thereof are not particularly limited as long as it is heat resistant and may provide mechanical support to the composite thermal barrier material. Specific examples thereof include, polymers having aromatic rings linked by sulfide, such as polyphenylene sulfide (PPS); polymers with aromatic heterocycles, such as polyimides, polybenzoxazoles, polybenzimidazoles, and polybenzothiazoles (PBTs); ladder polymers; and inorganic and semi organic polymers prepared from silicon-nitrogen, boron-nitrogen and phosphorous-nitrogen monomers. For example, polysilicates may be a specific type of inorganic polymer that can be thermally stable.

In addition, the flame retardant resin may include additives which contain heteroatoms as additional flame retardants. The additives may also include the following inorganic material, for example, metal hydroxide such as aluminum trihydrate, magnesium hydroxide or boehmite; metal oxide such as zinc borate, zinc oxide; and inorganic salt such as zinc hydroxystannate. Glass fiber with a length of 10 μm to 2 mm can also be added as a binder to improve mechanical strength of the composite materials.

As described above, three functional fillers, an expandable graphite 140, a high temperature decomposable material 150 and a phase change material 160, are included in the flame retardant resin matrix 130. The inventors of the present invention surprisingly found that, when used with the inner layer of aerogel material, the combination of the three functional fillers in the outer resin layer may largely improve the inhibition of thermal propagation when one cell has thermal runaway, thus may protect the battery pack from thermal damage due to thermal runaway of one cell and ensure a safe design of the battery pack.

Although the specific mechanism is not clear, it is assumed that, when one cell has thermal runaway in a battery pack, the volume of the expandable graphite may be increased dramatically when the temperature is above the critical temperature, thus the expanded material will squeeze air out of the cell which has thermal runaway; the high temperature decomposable material may be decomposed into inorganic compounds and gases (such as $CO_2$) which has a fire extinguishing function so that the flame retardant property may be enhanced; and the phase change material may undergo a phase change reaction in an elevated temperature which may absorb large amount of heat.

Therefore, together with the inner aerogel materials providing an ultra-low thermal conductivity to stop the thermal runaway, the composite thermal barrier material may inhibit thermal propagation when one cell has thermal runaway, and increase the safety of the battery pack.

According to the present invention, the two flame retardant layers 120 constitutes 10 to 30 wt %, preferably 15 to 25 wt % of the total weight of the composite thermal barrier materials. Furthermore, each of the flame retardant layers 120 contains 50 to 70 wt %, preferably 55 to 65 wt % of the flame retardant resin matrix 130, based on the total weight of the flame retardant layer 120. Each of the flame retardant layers 120 further contains the expandable graphite 140 in an amount of 15 to 40 wt %, preferably 20 to 35 wt %, based on the total weight of the flame retardant layer 120. Each of the flame retardant layers 120 further contains the high temperature decomposable material 150 in an amount of 10 to 30 wt %, preferably 15 to 25 wt %, based on the total weight of the flame retardant layer 120. Also, each of the flame retardant layers 120 further contains the phase change material 160 in an amount of 5 to 10 wt %, preferably 6 to 8 wt %, based on the total weight of the flame retardant layer 120.

According to the present invention, the flame retardant layer 120 has a thickness of 100 μm or more, preferably 200 μm or more. If the thickness is less than 100 μm, the desired thermal insulation and flame retardant properties cannot be obtained. In addition, in view of ease to manufacture and adaptability to the battery pack, the flame retardant layer 120 may have a thickness of 1000 μm or less, preferably 800 μm or less.

The expandable graphite 140 may be in a form of particle or flake. As above described, the expandable graphite may have extremely volumetric expansion at high temperature to squeeze air out of pack. Generally, the expandable graphite is produced by immersing natural graphite in a bath of chromic acid, then concentrated sulfuric acid, which forces the crystal lattice planes apart, thus expanding the graphite to obtain a layered structure having a large specific surface area. In this process, sulphur- or nitrogen-containing compounds may be added thereinto as intercalation agents.

Under the influence of heat, the layers in the expandable graphite separate like an accordion, and the graphite flakes expand. Expansion can commerce at a temperature from 180° C. to 250° C. which depending on the amount of intercalation agent. The expansion phenomenon happens suddenly and rapidly. The expandable graphite may have a final volume after expansion of 500 times or more than the initial volume. The expandable graphite may have an initial particle size of 20 μm or less before expansion.

The expandable graphite may be included in the flame retardant layer 120 in an amount of 15 to 40 wt %, preferably 20 to 35 wt %, as above described. If the amount is less than 15 wt %, the desired expansion effect cannot be obtained, and thus the effect of squeezing air out of the cell which has thermal runaway is not sufficient.

The high temperature decomposable material may decompose at an elevated temperature, such as above 200° C., to produce non-flammable gases, such as $CO_2$, to stop the thermal runaway of the on-set cell. The high temperature decomposable material is not particularly limited as long as it may decompose at high temperature and produce non-flammable gases. Specific examples thereof include inorganic carbonates such as $CaCO_3$, $Na_2CO_3$, $NaHCO_3$, $K_2CO_3$, $KHCO_3$, $CaHCO_3$ and $MgCO_3$; and organic carbonates such as poly propylene carbonate (PPC) and poly ethylene carbonate.

The high temperature decomposable material may be included in the flame retardant layer 120 in an amount of 10 to 30 wt %, preferably 15 to 25 wt %, as above described. If the amount is less than 10 wt %, the desired gas producing effect cannot be obtained, and thus the fire extinguishing function produced by the gas is not sufficient.

The phase change material 160 may have extreme heat absorption during phase change in an elevated temperature such as 250 to 300° C., and is capable of storing large amounts of energy whiling changing phase. Thus, it can be used in the flame retardant layer 120 to cool down the temperate of the whole battery system. The phase change material is not particularly limited as long as it may undergo phase change at the above temperature range. Specific examples thereof may include paraffin waxes, formic acid, caprillic acid, glycerin, methyl palmitate, pentadecanone, or other carbonhydrate and lipid derivative.

The phase change material may be included in the flame retardant layer 120 in an amount of 5 to 10 wt %, preferably 6 to 8 wt %, as above described. If the amount is less than 5 wt %, the desired effect of absorbing heat cannot be obtained.

The flame retardant layer 120 can be applied by a conventional coating method, such as spin coating and blade coating, onto both sides of the inner aerogel material. For example, the fillers of the expandable graphite, the high temperature decomposable material and the phase change material can be mixed into the flame retardant resin, and kneaded to dispersed the fillers uniformly in the flame retardant resin. Then, the resultant is applied by spin coating onto both sides of the inner aerogel material, cured to obtain the flame retardant layer 120. The curing process may involve adding an organic acid such as an organic acid with —COOH, —$SO_3H$, —RSOOH, or —RCOSH functional group, boron trifluoride, or the like to initiate a crosslink reaction to obtain the flame retardant layer 120.

According to the present invention, the composite thermal barrier material is prepared by a method comprising a process of forming the inner layer of an aerogel material; and a process of applying the flame retardant layers on both sides of the inner layer.

In some preferred embodiments, the process of forming the inner layer comprises the following steps:
 (1) forming a stable solution of a precursor for forming the aerosol;
 (2) gelating the solution by a polycondensation reaction;
 (3) aging the sol as obtained in step (2); and
 (4) subjecting the aged gel to a supercritical drying and shaping it into the desired form or shape.

Specifically, in step (1), a stable solution of a precursor for forming the aerosol is formed. As above described, the precursor may be a nano-sized material selected from silica, titanium oxide, chrome oxide, iron oxide, vandia, neodymium oxide, samaria, holmia, carbon (including carbon nanotubes), or any other metal oxide, or any combination thereof, as above described. In addition, an opacifier such as SiC, $TiO_2$ or carbon black or a binder such as glass fibers, as additives, may be included in the solution. Thus, in one embodiment, step (1) may involve formation of a stable solution of a precursor, an opacifier and a binder.

The method for forming the stable solution is not particularly limited, and any proper method may be used as long as it would not affect the desired properties according to the present invention. For example, the precursor and the optional additives may be dissolved or dispersed in a solvent selected from an aqueous liquid such as water, and water/ethanol mixture, and an organic solvent such as N-methylpyrrolidone and propylene carbonate.

According to the present invention, preferably, the step (1) involves preparing a stable silicate solution with water.

Next, in step (2), the solution containing the nano-sized precursor may be gelated by forming oxide- or alcohol-bridged network by a polycondensation reaction. As a result, the viscosity of the solution is dramatically increased.

According to the present invention, preferably, the polycondensation reaction may be initiated by changing pH of the solution. Specifically, an alkaline solution may be added to the solution to adjust the pH of the solution containing the nano-sized precursor. The alkaline solution is not particularly limited in the present invention, and examples thereof may include a solution of an alkali metal hydroxide such as NaOH or KOH, a solution of an alkali earth metal hydroxide such as MgOH and a solution of carbonate such as $Na_2CO_3$. The targeted pH is also not limited and may be determined according to the types of the nano-sized precursor.

For example, according to the present invention, when the nano-sized precursor contains silicate and titanate, an alkaline solution such NaOH may be used to adjust the pH of the solution to 3-4 to form a $SiO_2/TiO_2$ sol.

Next, in step (3), the obtained gel is aged, during which the polycondensation reaction continues until the sol transforms into a gel, accompanied by contraction of the gel network and expulsion of solvent from gel pores. The aging process is critical to prevention of cracks in the gel that has been formed.

The aging process may be carried out at a temperature of 45 to 60° C., preferably 50 to 55° C. for a time period of 8 to 24 hours, preferably 8 to 10 hours.

For example, in a case of forming a $SiO_2/TiO_2$ sol in step (2), the $SiO_2/TiO_2$ sol may be aged at 50° C. for 10 hours to form a gel.

Next, in step (4), the obtained gel is subjected to a supercritical drying and then shaped into the desired form or shape. In this step, the solvent will be removed.

As above described, the aged gel may be incubated at supercritical temperature above the critical temperature of a supercritical drying medium to obtain an aerogel. The supercritical drying medium may be selected from carbon dioxide, methanol or ethanol, and may be preferably carbon dioxide. The supercritical drying may be conducted at a supercritical temperature of 30 to 60° C., preferably of 40 to 45° C., over a holding time of 2 to 5 h, preferably 2 to 3 h.

For example, in a case of forming a $SiO_2/TiO_2$ gel in step (3), the aged gel may be incubated in a supercritical $CO_2$ medium at a supercritical temperature of 50° C. for 2 h to form a $SiO_2/TiO_2$ aerogel.

By the above steps (1) to (4), an aerogel material having the desired porosity and thickness can be obtained, and left for further use.

According to the present invention, the process for preparing the thermal barrier material may still include step (5) for applying the flame retardant layers on both sides of the inner layer.

As above described, the flame retardant layer can be applied by a conventional coating method onto both sides of the inner aerogel material. For example, the fillers of the expandable graphite, the high temperature decomposable material and the phase change material can be mixed into the flame retardant resin, and kneaded to obtain a mixture for forming the flame retardant layer. Then, the mixture is applied by spin coating onto both sides of the inner aerogel material, cured to obtain the flame retardant layer. In this way, the composite thermal barrier material according to the present invention can be formed via the above steps (1) to (5).

According to the present invention, in the other aspect, a battery pack is provided comprising a plurality of cells and spacers disposed between the two neighbor cells, wherein the spacer contains the composite thermal barrier material according to the present invention.

Figure 2:
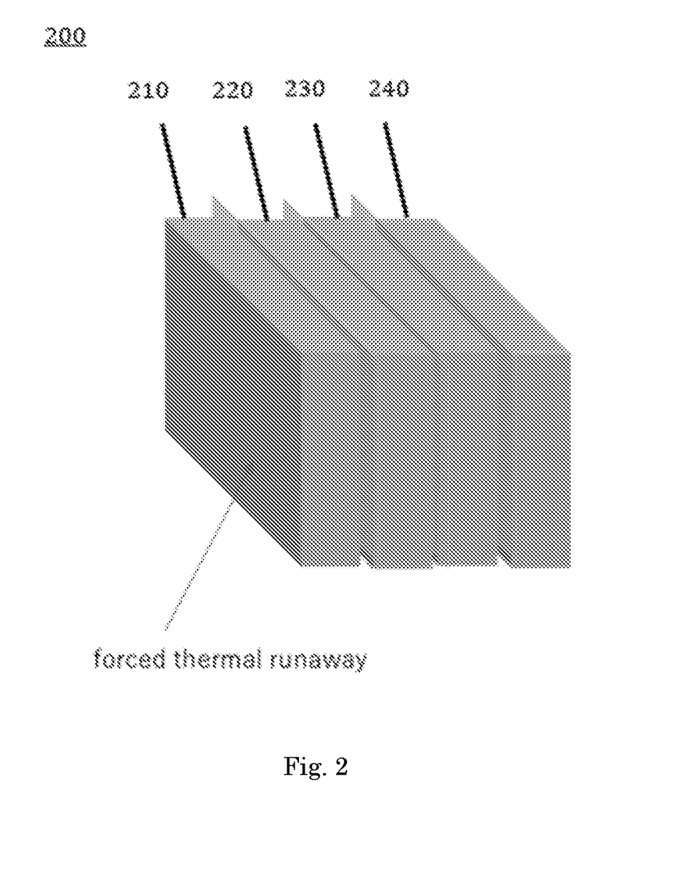
FIG. 2 is a perspective view schematically illustrating the structure of a battery pack for test in Comparative Example 3 and Examples 7 to 9.

That is to say, the composite thermal barrier material can be used as a cushioning material between tow neighbor cells. For example, the composite thermal barrier material may be a thermal barrier sheet or film interposed between two neighbor cells in the battery pack. When a cell goes to thermal runaway, it can protect the neighbor cell from heat spreading (as shown in FIG. 2).

As a cell unit in the battery pack, a cell may be common secondary cell used in the art such as lithium secondary cell, and is not particularly limited. For example, the cell may be a prismatic type cell or a pouch type cell. Usually, a cell contains a positive electrode, a negative electrode and an electrolyte.

According to the present invention, there is also provided a device comprising the battery pack according to the present invention. The battery pack is used as a power supply of the device. For example, the device may be one or more of electric vehicles including electric vehicles (EV), hybrid electric vehicles (HEV) or plug-in hybrid electric vehicles (PHEV).

EXAMPLES

Hereinafter, the embodiments are described in detail using examples but are not limited by the examples.

Comparative Example 1

Mica (IEC-60371-2, AXIM MICA) with a thickness of 1 mm is used as a thermal barrier film.

The thermal barrier film was placed on a hot plate (Heatpad, MHI), with one side thereof contacted the hot plate, and heated to 600° C. for 300 s. The temperature of the other side of the thermal barrier film was recorded. The result is listed in the below table 1.

Comparative Example 2

Mica (IEC-60371-2, AXIM MICA) with a thickness of 2 mm is used as a thermal barrier film.

The thermal barrier film was placed on a hot plate, with one side thereof contacted the hot plate, and heated to 600° C. for 300s. The temperature of the other side of the thermal barrier film was recorded. The result is listed in the below table 1.

Example 1

Preparation of a $SiO_2/TiO_2$ Aerogel

A $SiO_2/TiO_2$ aerogel is prepared by the steps (1) to (4) as follows:

(1). First, 4 g $Na_4SiO_4$ (Sigma Aldrich) and 3 g $Na_2Ti_3O_7$ (Sigma Aldrich) having a nano size were weighed and added to 100 ml of distilled water, stirred well to prepare a stable aqueous solution of $Na_4SiO_4$ and $Na_2Ti_3O_7$.

(2). An alkaline solution (1 M KOH, Sigma Aldrich) was slowly added into the stable solution to adjust pH of the stable solution to 3.5 to form a $SiO_2/TiO_2$ sol.

(3). The obtained $SiO_2/TiO_2$ sol was aged in water for 10 h to form a gel.

(4). The aged gel was incubated in a supercritical $CO_2$ medium at a supercritical temperature of 50° C. for 2 h to form a $SiO_2/TiO_2$ aerogel.

By the above steps (1) to (4), an aerogel containing 72 wt % of $SiO_2/TiO_2$ was obtained. In addition, 25 wt % of SiC (opacifier, Sigma Aldrich, 378097) and 3 wt % of glass fiber (binder, Asashi Kasei, PA66) was also added in step (1). The obtained SiO$_2$/TiO$_2$ aerogel was used as the inner thermal barrier layer with a thickness of 0.5 mm.

Preparation of a Flame Retardant Layer

In this process, poly phenylene sulfide (PPS) resin (18235, Sigma Aldrich) is used as the matrix resin for the coating layer on both sides of the obtained aerogel. Specifically, an expandable graphite (808121, Sigma Aldrich) (20 µm), Polypropylene carbonate (PPC) (389024, Sigma Aldrich) (10 µm) and paraffin (327204, Sigma Aldrich) are mixed into the PPS resin such that the expandable graphite is included in an amount of 20 wt %, PPC is included in an amount of 10 wt % and paraffin is included in an amount of 5 wt % based on the total weight of the mixture, and kneaded to disperse the three fillers uniformly in the resin.

The obtained mixture is applied by spin coating onto the both sides of the obtained aerogel, and cured to obtain a flame retardant layer having a thickness of 0.2 mm on each side.

The composite thermal barrier film was placed on a hot plate, with one side thereof contacted the hot plate, and heated to 600° C. for 300s. The temperature of the other side of the thermal barrier film was recorded. The result is listed in the below table 1.

Example 2

The composite thermal barrier film was prepared by the same process as that described in Example 1, except that the aerogel is prepared to have a thickness of 1 mm.

The composite thermal barrier film was placed on a hot plate, with one side thereof contacted the hot plate, and heated to 600° C. for 300s. The temperature of the other side of the thermal barrier film was recorded. The result is listed in the below table 1.

Example 3

The composite thermal barrier film was prepared by the same process as that described in Example 1, except that the aerogel is prepared to have a thickness of 2 mm.

The composite thermal barrier film was placed on a hot plate, with one side thereof contacted the hot plate, and heated to 600° C. for 300s. The temperature of the other side of the thermal barrier film was recorded. The result is listed in the below table 1.

Example 4

The multi-layer composite material as prepared in Example 1 is used in this Example.

The obtained multi-layer composite material was placed on a hot plate, with one side thereof contacted the hot plate, and heated to 600° C. for 600s. The temperature of the other side of the multi-layer composite material was recorded. The result is listed in the below table 1.

Example 5

The multi-layer composite material as prepared in Example 2 is used in this Example.

The obtained multi-layer composite material was placed on a hot plate, with one side thereof contacted the hot plate, and heated to 600° C. for 600s. The temperature of the other side of the multi-layer composite material was recorded. The result is listed in the below table 1.

Example 6

The multi-layer composite material as prepared in Example 3 is used in this Example.

The obtained multi-layer composite material was placed on a hot plate, with one side thereof contacted the hot plate, and heated to 600° C. for 600s. The temperature of the other side of the multi-layer composite material was recorded. The result is listed in the below table 1.

TABLE 1

Results of Comparative Example1-2, and Examples 1-6

| Examples | Thickness of thermal barrier material | Heating time | Temperature of the hotplate surface | Surface temperature of thermal barrier materials after heating |
|---|---|---|---|---|
| Comparative example 3 | 1 mm | 300 s | 601° C. | 530° C. |
| Comparative example 2 | 2 mm | 300 s | 600° C. | 470° C. |
| Example 1 | 0.9 mm | 300 s | 599° C. | 277° C. |
| Example 2 | 1.4 mm | 300 s | 600° C. | 185° C. |
| Example 3 | 2.4 mm | 300 s | 600° C. | 153° C. |
| Example 4 | 0.9 mm | 600 s | 601° C. | 292° C. |
| Example 5 | 1.4 mm | 600 s | 599° C. | 243° C. |
| Example 6 | 2.4 mm | 600 s | 600° C. | 205° C. |

Seen from table 1, compared with Comparative Examples 1 to 2, Examples 1-3, having similar thicknesses, has a much lower surface temperature on the other side, after heated to 600° C. for 300s. Further, it can be seen from comparison between Comparative Examples 1 to 2 and Examples 4 to 6 that, even if the material is heated to 600° C. for 600s, a much lower surface temperature on the other side is also obtained, which shows an excellent thermal insulation effect achieved by the composite thermal barrier material according to the present invention. In addition, by comparing Examples 1 to 3 or Examples 4 to 6, it can be seen that the thicker the aerogel layer is, the better the thermal insulation effect is.

Comparative Example 3

Mica (IEC-60371-2, AXIM MICA) with a thickness of 1 mm is used as a thermal barrier film, which is used in a test for evaluating the thermal insulation effect in a battery pack as described below.

FIG. 2 is a perspective view schematically illustrating the structure of a battery pack for the test.

As shown in FIG. 2, a battery pack 200 with 4 prismatic cells (230 Wh/kg, 560 Wh/L) is used as test vehicle. Cell 1, cell 2, cell 3 and cell 4 are designated to 210, 220, 230 and 240 in FIG. 2, and arranged parallelly. One piece of thermal barrier film is interposed between two neighbor cells. Thus totally 3 piece of films was used in this pack (As shown in FIG. 2). Cell 1 is forced to have thermal runaway. The waiting time to thermal runaway of the rest of the cells are recorded.

The result of Comparative Example 3 is shown in Table 2.

Example 7

The multi-layer composite material is prepared according to the method as described in Example 1, except that the flame retardant layer only contains 10 wt % of expandable graphite (20 μm).

The test for evaluating the thermal insulation effect as described in Comparative Example 3 is conducted for the multi-layer composite material. Cell 1 is forced to have thermal runaway. The waiting time to thermal runaway of the rest of the cells are recorded.

The result of Example 7 is shown in Table 2.

Example 8

The multi-layer composite material is prepared according to the method as described in Example 1, except that the flame retardant layer only contains 10 wt % of expandable graphite (20 μm) and 20 wt % of PPC (10 μm).

The test for evaluating the thermal insulation effect as described in Comparative Example 3 is conducted for the multi-layer composite material. Cell 1 is forced to have thermal runaway. The waiting time to thermal runaway of the rest of the cells are recorded.

The result of Example 8 is shown in Table 2.

Example 9

The multi-layer composite material as prepared in Example 1 is used in this example.

The test for evaluating the thermal insulation effect as described in Comparative Example 3 is conducted for the multi-layer composite material. Cell 1 is forced to have thermal runaway. The waiting time to thermal runaway of the rest of the cells are recorded.

The result of Example 9 is shown in Table 2.

TABLE 2

Results of Comparative Example 3, and Example 7-9.

| | Thickness of thermal barrier material | Time to thermal runaway | | |
|---|---|---|---|---|
| | | Cell 2 | Cell 3 | Cell 4 |
| Comparative example 3 | 1 mm | 3 m 53 s | 7 m 5 s | 10 m 11 s |
| Example 7 | 0.9 mm | 4 m 45 s | 9 m 3 s | 13 m 54 s |
| Example 8 | 0.9 mm | 5 m 30 s | 10 m 57 s | 16 m 12 s |
| Example 9 | 0.9 mm | 6 m 40 s | 13 m 6 s | 19 m 23 s |

As can be seen from table 2, as compared with Comparative Example 3, Example 7 containing expandable graphite may largely extend the waiting time to thermal runaway for Cells 2, 3 and 4. The addition of PPC may further extend the waiting time, as can be seen from comparison between Example 7 and 8; in turn, the addition of paraffin may further extend the waiting time, as seen from Example 8 and 9. Thus, it can be seen from table 2 that the composite thermal barrier material according to the present invention may have excellent thermal insulation effect, as compared with the conventional thermal barrier materials.

As for table 2, it is known that an improvement of several minutes in the waiting time to thermal runaway is a large improvement in the art. In addition, paraffin is added in a relatively smaller amount (5 wt %) in the Examples, which, however, can have an obvious effect as seen from table 2. It can be expected that the thermal insulation effect can be further improved by increasing the usage amount of paraffin.

Therefore, seen from tables 1 and 2, it can be expected that the composite thermal barrier material according to the present invention can be used in a battery pack to stop the thermal propagation due to its excellent thermal insulation effect as above verified.

Example 10

The aerogel as prepared in Example 1 is used in this example. The obtained aerogel was divided to three test pieces having the same sizes.

Measurement of Shrinkage

The obtained aerogel is subjected to the shrinkage measurement according to ASTM C356 and the dedicated "in-house" techniques. In this method of "full soak" exposure, the tested materials are completely immersed and heated to 100° C., 600° C., 900° C. for a period of 24 hours, respectively, after which the dimensional changes are measured. The result of Example 10 is shown in Table 3.

Example 11

A $SiO_2/TiO_2$ aerogel was prepared in the same manner with that in Example 1, except that the aerogel contains 63 wt % of $SiO_2/TiO_2$, 34 wt % of
SiC and 3 wt % of glass fiber. The obtained aerogel was divided to three test pieces having the same sizes.

Measurement of Shrinkage

The obtained aerogel is subjected to the shrinkage measurement according to ASTM C356 and the dedicated "in-house" techniques. In this method of "full soak" exposure, the tested materials are completely immersed and heated to 100° C., 600° C., 900° C. for a period of 24 hours, respectively, after which the dimensional changes are measured. The result of Example 11 is shown in Table 3.

TABLE 3

Results of Examples 10 to 11

| | Temperature (° C.) | Shrinkage (%) |
|---|---|---|
| Example 10 | 100 | 0 |
| | 600 | 0 |
| | 900 | 1.7 |
| Example 11 | 100 | 0 |
| | 600 | 0 |
| | 900 | 1 |

As shown in Table 3, the $SiO_2/TiO_2$ aerogels according to Examples 10-11 show an extremely low shrinkage at a high temperature. For example, the aerogels exhibit no shrinkage (0%) after they are heated at 100° C. and 600° C. for 24 hours in Examples 10-11. Even at a higher temperature of 900° C., the aerogel exhibits a shrinkage of 1.7% at most in Example 10, after it is heated for 24 hours. As commonly known, as the temperature increases, the particles of $SiO_2/TiO_2$ begin to sinter and fuse together, changing the nature of the structure and increasing the solid conduction component of heat transfer. However, With the microporous insulation structure according to the present invention, an extremely low shrinkage may be obtained, which would rarely have any influence on the effective performance when used in a battery.

Comparative Example 4

Mica (IEC-60371-2, AXIM MICA) with a 3×3 mm² area and a thickness of 1 mm is used as a test piece in this example.

Measurement of Compression Rate

The mica is compressed by a load of 10 kg (5×5 mm²) for 1 h. The thickness of the test piece before compression test and after compression test are recorded to determine the compression set of the test piece according to the following equation.

compression set (%)=$(t_0-t)/t_0$, wherein $t_0$ denotes a thickness of the test piece before compression test, and t denotes a thickness of the test piece after compression test.

The results of Comparative example 4 is shown in Table 4.

Example 12

The aerogel was prepared by the same process as that described in Example 1, except that the aerogel is prepared to have a 3×3 mm² area and thickness of 1 mm.

Measurement of Compression Rate

The obtained aerogel is compressed by a load of 10 kg (5×5 mm²) for 1 h. The thickness of the test piece before compression test and after compression test are recorded to determine the compression set of the test piece according to the equation in Comparative example 4. The result of Example 12 is shown in Table 4.

Example 13

The aerogel was prepared by the same process as that described in Example 1, except that the aerogel contains 63 wt % of $SiO_2/TiO_2$, 34 wt % of SiC and 3 wt % of glass fiber. The obtained aerogel is prepared to have a 3×3 mm² area and thickness of 1 mm.

Measurement of Compression Rate

The obtained aerogel is compressed by a load of 10 kg (5×5 mm²) for 1 h. The thickness of the test piece before compression test and after compression test are recorded to determine the compression set of the test piece according to the equation in Comparative example 4. The result of Example 13 is shown in Table 4.

TABLE 4

Results of Comparative Example 4, and Example 12-13.

| | Thickness before compression test | Thickness after compression test | Compression rate |
|---|---|---|---|
| Comparative example 4 | 1 mm | 0.99 mm | 1% |
| Example 12 | 1 mm | 0.85 mm | 15% |
| Example 13 | 1 mm | 0.89 mm | 11% |

Seen from the above Table 4, the aerogel materials as the inner layer of the composite thermal barrier material according to the present invention in Examples 12 to 13 have much higher Compression set (rate) as compared to the mica material in Comparative example 4, which shows that the composite thermal barrier material may be appropriately deformed when it is subjected to a compression force applied by the neighbor cells due to thermal expansion in a battery. Thus, it can be understood that the composite thermal barrier material according to the present invention can be compressible in order to accommodate the volumetric change during the operation of a lithium secondary battery, which is advantageous particularly for the applications in a pouch cell.

While specific embodiments of the present invention have been described above, various applications and modifications will become readily apparent to those skilled in the art without departing from the scope of the present invention.

What is claimed is:

1. A composite thermal barrier material which has a sandwich structure for a battery pack, comprising:
   an inner layer comprising an aerogel material which has a thermal conductivity of 25 mW/m-K or less; and
   two flame retardant layers which comprising a flame retardant resin matrix,
   wherein the inner layer is sandwiched by the two flame retardant layers, and
   each of the two flame retardant layers contains an expandable graphite, a high temperature decomposable material and a phase change material as functional fillers dispersed in the flame retardant resin matrix.

2. The composite thermal barrier material according to claim 1, wherein the inner layer has a thickness of 300 μm or more.

3. The composite thermal barrier material according to claim 1, wherein the aerogel material contains an opacifier selected from the group consisting of SiC, TiO2 and carbon black and a glass fiber binder.

4. The composite thermal barrier material according to claim 1, wherein the two flame retardant layers each has a thickness of between 100 μm and 1000 μm.

5. The composite thermal barrier material according to claim 1, wherein each of the two flame retardant layers contains an expandable graphite, and wherein the expandable graphite is present in each flame retardant layer in an amount of 15 to 40 wt % based on the total weight of the respective flame retardant layer.

6. The composite thermal barrier material according to claim 1, wherein each of the two flame retardant layers contains a phase change material, and wherein the phase change material is present in each flame retardant layer in an amount of 5 to 10 wt % based on the total weight of the respective flame retardant layer.

7. The composite thermal barrier material according to claim 1, wherein each of the two flame retardant layers contains a high temperature decomposable material, and wherein the high temperature decomposable material is present in each flame retardant layer in an amount of 10 to 30 wt % based on the total weight of the respective flame retardant layer.

8. A method for preparing the composite thermal barrier material according to claim 1, comprising:
   forming the inner layer of an aerogel material; and
   applying the flame retardant layers on both sides of the inner layer.

9. The method according to claim 8, wherein the inner layer has a thickness of 300 μm or more.

10. The method according to claim 8, wherein each of the two flame retardant layers has a thickness of between 100 µm and 1000 µm.

11. The method according to claim 8, wherein each of the two flame retardant layers contains an expandable graphite, and wherein the expandable graphite is present in each flame retardant layer in an amount of 15 to 40 wt % based on the total weight of the respective flame retardant layer.

12. The method according to claim 8, wherein each of the two flame retardant layers contains a phase change material, and wherein the phase change material is present in each flame retardant layer in an amount of 5 to 10 wt % based on the total weight of the respective flame retardant layer.

13. The method according to claim 8, wherein the flame retardant layer contains a high temperature decomposable material, and wherein the high temperature decomposable material is present in each flame retardant layer in an amount of 10 to 30 wt % based on the total weight of the respective flame retardant layer.

14. A battery pack comprising a plurality of cells and spacers disposed between two neighbor cells, wherein the spacers contain the composite thermal barrier material according to claim 1.

15. The battery pack according to claim 14, wherein the inner layer has a thickness of 300 µm or more.

16. The battery pack according to claim 14, wherein each of the two flame retardant layers has a thickness of of between 100 µm and 1000 µm.

17. The battery pack according to claim 14, wherein each of the two flame retardant layers contains an expandable graphite, and wherein the expandable graphite is present in each flame retardant layer in an amount of 15 to 40 wt % based on the total weight of the respective flame retardant layer.

18. The battery pack according to claim 14, wherein each of the two flame retardant layers contains a phase change material, and wherein the phase change material is present in each flame retardant layer in an amount of 5 to 10 wt % based on the total weight of the respective flame retardant layer.

19. The battery pack according to claim 14, wherein each of the two flame retardant layers contains a high temperature decomposable material, and wherein the high temperature decomposable material is present in each flame retardant layer in an amount of 10 to 30 wt % based on the total weight of the respective flame retardant layer.

* * * * *